United States Patent
Tramoni

(10) Patent No.: US 10,298,295 B2
(45) Date of Patent: *May 21, 2019

(54) METHOD FOR DETECTING THE EVENTUAL PRESENCE OF AN OBJECT BY A CONTACTLESS READER, AND CORRESPONDING READER

(71) Applicant: STMicroelectronics (Rousset) SAS, Rousset (FR)

(72) Inventor: Alexandre Tramoni, Le Beausset (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/118,175

(22) Filed: Aug. 30, 2018

(65) Prior Publication Data

US 2018/0375547 A1    Dec. 27, 2018

Related U.S. Application Data

(63) Continuation of application No. 15/444,576, filed on Feb. 28, 2017, now Pat. No. 10,103,782.

(30) Foreign Application Priority Data

Sep. 29, 2016    (FR) .................................. 16 59285

(51) Int. Cl.
*H04B 5/00*  (2006.01)
*G06K 7/10*  (2006.01)
*G01S 13/04*  (2006.01)

(52) U.S. Cl.
CPC ............ *H04B 5/0031* (2013.01); *G01S 13/04* (2013.01); *G06K 7/10128* (2013.01)

(58) Field of Classification Search
CPC combination set(s) only.
See application file for complete search history.

(56) References Cited

U.S. PATENT DOCUMENTS 6,473,028 B1 * 10/2002  Luc ...................... G06K 7/0008
                                                        342/118
6,650,229 B1 * 11/2003  Wuidart ............... G06K 7/0008
                                                        340/10.2

(Continued)

FOREIGN PATENT DOCUMENTS

EP      1840790 A2    10/2007
EP      2602942 A1     6/2013

(Continued)

OTHER PUBLICATIONS

EP1715658 International Search Report, dated Jul. 11, 2017 (Year: 2017).*

*Primary Examiner* — Nay A Maung
*Assistant Examiner* — Erica L Fleming-Hall
(74) *Attorney, Agent, or Firm* — Slater Matsil, LLP

(57) ABSTRACT

A method can be used for detecting a potential presence of an object by a reader capable of mutually communicating via a contactless communications protocol. An antenna of the reader transmits a magnetic field on a carrier signal having a sub-carrier modulated by a first data sequence. The modulated sub-carrier is non-interpretable by the object. The antenna of the reader receives a signal resulting from the transmission. The reader demodulates the sub-carrier of the resulting signal so as to extract a second data sequence from the resulting signal. The first data sequence and second data sequence are correlated and the potential presence or absence of the object is determined based upon the result of the correlating.

20 Claims, 5 Drawing Sheets

(56) References Cited

U.S. PATENT DOCUMENTS

| | | | |
|---|---|---|---|
| 6,703,921 B1* | 3/2004 | Wuidart | G06K 7/0008 340/10.2 |
| 2004/0130438 A1* | 7/2004 | Garber | G06K 7/0008 340/10.2 |
| 2006/0038569 A1* | 2/2006 | Kellermann | G01V 3/15 324/326 |
| 2006/0226833 A1* | 10/2006 | Kubotera | G01V 3/105 324/236 |
| 2007/0063820 A1* | 3/2007 | Kung | G06K 7/0008 340/10.1 |
| 2008/0237345 A1* | 10/2008 | Moullette | H04B 5/02 235/438 |
| 2011/0309913 A1* | 12/2011 | Peters | G06K 7/0008 340/10.1 |
| 2013/0225071 A1* | 8/2013 | Royston | H04B 5/0031 455/41.1 |
| 2014/0111019 A1* | 4/2014 | Roy | G01V 3/081 307/104 |
| 2015/0178529 A1* | 6/2015 | Theurer | G06K 7/10366 340/10.1 |
| 2017/0141622 A1* | 5/2017 | Meichle | B60L 11/182 |

FOREIGN PATENT DOCUMENTS

| | | | |
|---|---|---|---|
| EP | 2635052 A1 | | 9/2013 |
| EP | 2602942 B1 | * | 1/2018 |

* cited by examiner

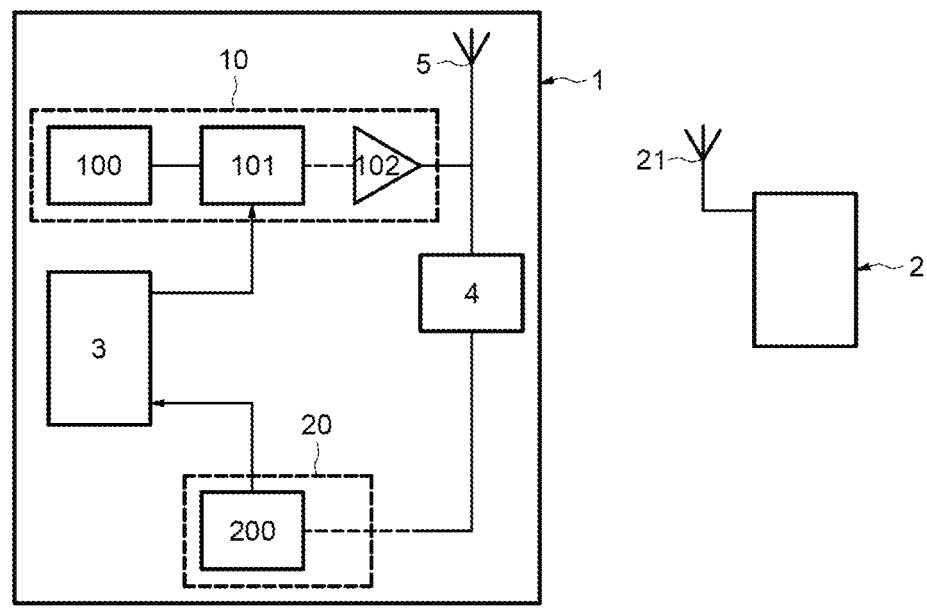
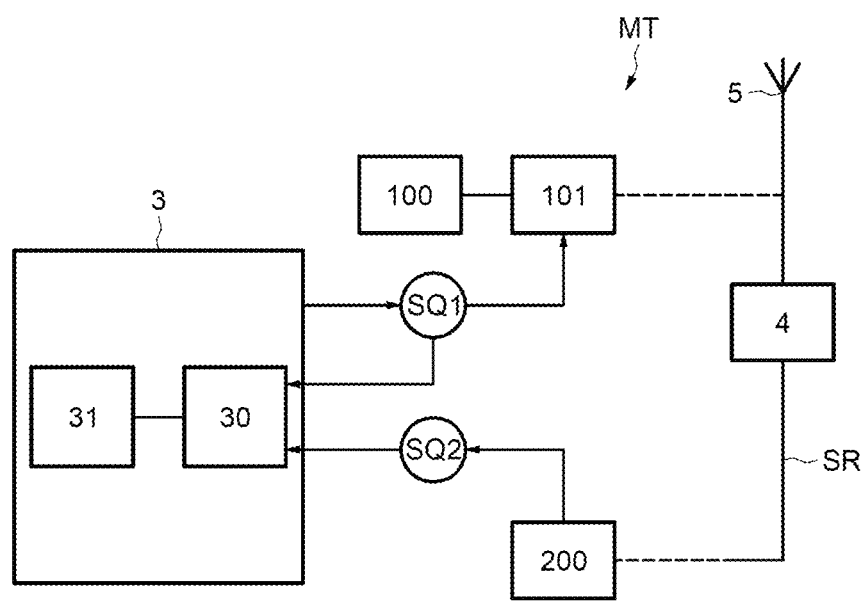

METHOD FOR DETECTING THE EVENTUAL PRESENCE OF AN OBJECT BY A CONTACTLESS READER, AND CORRESPONDING READER

CROSS-REFERENCE TO RELATED APPLICATIONS

This application is a continuation of U.S. patent application Ser. No. 15/444,576, filed Feb. 28, 2017, which application claims priority to French Patent Application No. 1659285, filed on Sep. 29, 2016, which applications are hereby incorporated herein by reference.

TECHNICAL FIELD

Embodiments of the invention relate to a method for detecting the eventual presence of an object by a contactless reader, and a corresponding reader.

BACKGROUND

Near-field communications, known by those skilled in the art under the acronym NFC, is a technology for wireless connectivity which allows a communication over a short distance, for example 10 cm, between electronic devices, such as for example contactless smartcards or mobile telephone emulated in card mode, and readers.

NFC technology is particularly adapted for connecting any type of user device and allows quick and easy communications.

A contactless object is an object capable of exchanging information via an antenna with another contactless object, for example a reader, according to a contactless communications protocol.

An object which is a contactless object is an object compatible with NFC technology.

NFC technology is an open technology platform standardized in the ISO/IEC 18092 and ISO/IEC 21481 standards but incorporates numerous already existing standards such as for example the type A and type B protocols defined in the ISO-14443 standard which are communications protocols that may be used in NFC technology.

Aside from its conventional telephone function, a cellular mobile telephone may be used (if it is equipped with specific means) for exchanging information with another contactless device, for example a contactless reader, based on a contactless communications protocol usable in NFC technology.

This allows information to be exchanged between the contactless reader and secure elements situated within the mobile telephone. Numerous applications are thus possible such as mobile ticketing in public transport (the mobile telephone behaves as a travel ticket) or else mobile payment (the mobile telephone behaves as a payment card).

When information is transmitted between a reader and an object emulated in tag or card mode, the reader generates a magnetic field by means of its antenna which is generally, in the standards conventionally used, a sine wave (the carrier) at 13.56 MHz.

In order to transmit information from the reader to the object, the reader uses an amplitude modulation of the carrier.

For its part, the object demodulates the received carrier so as to deduce from it the data transmitted from the reader.

For transmission of information from the object to the reader, the reader generates the magnetic field (the carrier) without modulation. The antenna of the object emulating the tag then modulates the field generated by the reader, as a function of the information to be transmitted. The frequency of this modulation corresponds to a sub-carrier of the carrier. The frequency of this sub-carrier depends on the communications protocol used and may for example be equal to 848 kHz.

This modulation is carried out by modifying the load connected to the terminals of the antenna of the object.

By modifying the load across the terminals of the antenna of the object, the output impedance of the antenna of the reader changes owing to the magnetic coupling between the two antennas. This results in a change in the amplitudes and/or the phases of the voltages and currents present on the antennas of the reader and of the object. Accordingly, in this way, the information to be transmitted from the object to the reader is transmitted by load modulation to the antenna current of the reader.

The variation in load carried out during the load modulation results in an amplitude and/or of phase modulation of the signal (voltage or current) on the antenna of the reader. A copy of the antenna current is generated and injected into the receiver chain of the reader where it is demodulated and processed so as to extract the transmitted information.

The best transfer of power between the reader and the tag is obtained when the tag is equipped with a circuit matched with the resonant circuit of the reader, and itself resonant at the frequency of the signal transmitted by the reader, for example 13.56 MHz.

Before the reader and the object communicate according to a contactless communications protocol, a phase is provided for detection by the reader of the potential presence of the object close to the latter.

Such a mode is for example described in the contactless communication standards and includes an emission by the reader, more or less often, for example every second, of requests and wait periods for specific responses coming from the object.

If these specific responses are received, then the object is detected and the communication can begin.

However, such a detection mode consumes a lot of power, which is detrimental for a reader operating on battery power.

There currently exists a low-consumption mode for detecting objects which consists, in a calibration phase, in emitting pulses of magnetic field at a frequency of 13.56 MHz and in measuring the amplitude of the electromagnetic field on the antenna. Indeed, if a card comes close to the antenna of the reader, this results in a voltage drop on the antenna of the reader due to a coupling effect.

The calibration phase therefore supplies a reference value for the amplitude of the magnetic field measured on the antenna.

Then, aside from calibration, if at a given moment in time the measured amplitude of the electromagnetic field on the antenna of the reader changes from this reference value, then this means that there has been a radiofrequency phenomenon (coupling effect) which may be due to the potential presence of a contactless object or else to the presence, for example, of a mass of iron in the environment of the reader.

A verification is then carried out for the effective presence of the object using the standardized procedure, in other words the sending of requests and waiting to receive acknowledgement signals.

If this verification phase arrives at the conclusion that the coupling effect obtained during the detection phase did not correspond to an effective detection of an object, a calibration phase is then repeated in order to obtain a new reference value.

Such a detection has drawbacks.

One reason is that the reader is equipped with a receiver chain comprising a demodulator which is set to the frequency of the sub-carrier used by the object for transmitting information to the reader.

Thus, this sub-carrier is for example equal to 848 KHz in the type A and type B protocols defined in the ISO-14443 standard.

However, if the measurement of the amplitude of the electromagnetic field on the antenna is carried out by specific means without using the receiver chain, then the sensitivity of the detection is well below the sensitivity of the receiver chain during the reception of the data from the object to the reader.

In other words, although the object could perfectly well communicate with the reader at a certain distance, the detection of the presence of the object would only be effective at a shorter distance.

If, on the other hand, the measurement of the amplitude of the electromagnetic field is carried out using the receiver chain, the detection signal will then be extremely weak owing to the filtering of the 13.56 MHz carrier frequency by the receiver chain.

This will therefore result in difficulties in the detection of the object.

SUMMARY

Various embodiments of the invention and their implementation relate to the contactless communication between a reader and an object, in particular an NFC (for Near-Field Communications) object, for example a transponder of the tag type, a contactless smartcard or else a mobile telephone emulated in card mode, these examples being non-limiting, and more particularly the detection of the potential presence of such an object by the reader.

According to one embodiment and its implementation, a detection of a contactless object by a contactless reader offering a low power consumption is provided, while at the same time offering a detection sensitivity at least as good as the communication sensitivity for the data.

According to one aspect, a method is provided for detecting the potential presence of an object by a reader capable of mutually communicating via at least one contactless communications protocol.

This method comprises a detection phase comprising a transmission by an antenna of the reader of a magnetic field on a carrier signal, for example a sine wave at 13.56 MHz, having a sub-carrier, for example a sub-carrier at 848 KHz in the case of a type A or B protocol of the 14443 standard, modulated by a first data sequence, this modulation being chosen so as to be at least non-interpretable by the object.

The method furthermore comprises a reception on the antenna of the reader of a signal resulting from this transmission and a demodulation in the reader of the sub-carrier of the resulting signal in such a manner as to extract from it a second data sequence.

The method then comprises a correlation between the two data sequences and a detection of the potential presence or of the absence of the object depending on the result of the correlation.

Thus, the pulses of the electromagnetic field, for example at 13.56 MHz, are generated but this field is modulated on a sub-carrier, with a modulation index chosen so as to be at least non-interpretable by the object, and the reader demodulates its own modulated sub-carrier, by advantageously using the receiver chain, and can thus correlate the signal transmitted with the signal resulting from this transmission.

The result of this correlation allows either the potential presence of an object to be detected, which will of course need to be confirmed by a verification phase, or else the absence of an object.

Although, in theory, any given frequency may be chosen for the sub-carrier modulated in the detection phase, it is preferable to choose the frequency of the modulated sub-carrier from within a group formed by one or more reference frequencies associated with one or more reference contactless communications protocols able to be used by the object for transmitting information to the reader.

Thus, a frequency of 848 KHz could advantageously be chosen, which is used in the type A or B protocols of the 14443 standard, or else a frequency of 212 KHz or 424 KHz, which is used in the type F protocol of this 14443 standard, or otherwise a frequency of 26 KHz which is used in the 15693 standard.

It goes without saying that, in this detection phase, the modulation of the sub-carrier emitted by the reader must not be able to be interpreted by the contactless object as being an effective transmission of information. Thus, for example, during an effective communication of information between the reader and the card, it is provided for the modulation index to be higher than 7% for example for the case of the type B or F protocols of the 14443 standard.

As a consequence, a modulation index of less than 7% used for modulating the sub-carrier in the detection phase will be able to be detected by the contactless object but will not be interpreted as an effective transmission of information coming from the reader.

However, it is preferable for the modulation of the sub-carrier to be not only non-interpretable but also non-detectable by the object.

For this purpose, a modulation index advantageously lower than a threshold index will be chosen, compatible with a non-detectability of the modulation by the object, for example a modulation index of less than 1%.

Generally speaking, it is advantageous for the modulation index used to correspond to the minimum modulation index that the reader is capable of demodulating.

According to one embodiment, the result of a perfect correlation between the two data sequences is equal to a reference correlation value, typically the value 1. An absence of the object is then detected if the result of the correlation between the two data sequences is less than or equal to the reference correlation value and greater than or equal to a threshold correlation value, whereas a potential presence of the object is detected if the result of the correlation between the two data sequences is less than the threshold correlation value.

This threshold correlation value is advantageously determined prior to the detection phase, during a calibration phase carried out in the absence of any object.

More precisely, according to one embodiment, the determination of the threshold correlation value comprises a transmission by the antenna of the reader of the magnetic field on the carrier signal having the sub-carrier modulated by a calibration data sequence (which may be identical to or different from the first data sequence used in the detection phase), a reception on the antenna of the reader of a signal resulting from this transmission, a demodulation in the reader of the sub-carrier of the resulting signal so as to extract from it a third data sequence, and a correlation between the calibration data sequence and the third data sequence, the result of this correlation supplying the threshold correlation value.

The very first calibration phase may be carried out for example at the factory, or else initially prior to the first use of the reader so as to take into account the environment of the latter.

Furthermore, the method advantageously additionally comprises, in the case of a detection of a presence of the object following the detection phase, a verification phase comprising a verification of the effective presence of the object.

As indicated hereinbefore, the presence of the sub-carrier modulated in the detection phase is chosen advantageously from within a group formed by one or more reference frequencies associated with one or more reference contactless communications protocols able to be used by the object for transmitting information to the reader.

In addition, according to one embodiment, in the verification phase, the verification of the effective presence of the object comprises, for at least one of the reference contactless communications protocols, a transmission by the reader of specific information for identification requests, typically requests conforming to the standardized protocols used, and a wait period for receiving specific information in return, typically acknowledgements conforming to the standard, transmitted by the object according to this reference protocol.

In practice, if the reader is capable of detecting various types of cards, it will be able to carry out this verification for each of the communications protocols for which the demodulator can be adjusted to the frequency of the corresponding sub-carrier until it receives an acknowledgement representing the effective presence of an object.

Accordingly, if once all the communications protocols implemented in the reader have been tested and no corresponding acknowledgement has been received, then it may be considered that the potential detection of the object in fact corresponded to a false detection which was for example due to the appearance in the environment of the reader of a metal mass in the neighborhood of its antenna.

In this case, in the effective absence of an object following the verification phase, a new execution of the calibration phase may advantageously be carried out so as to determine a new threshold correlation value.

According to another aspect, a reader is provided that is capable of communicating with an object by at least one contactless communications protocol via an antenna.

A processing circuit includes a reader that is configured to detect a potential presence or absence of the object. In certain embodiments, this includes a transmitter configured for transmitting, via the antenna, a magnetic field on a carrier signal. A modulator is configured for modulating a sub-carrier of the carrier signal by a first data sequence. The modulation being at least non-interpretable by the object. A receiver is configured for receiving a signal on the antenna resulting from this transmission. A demodulator is configured for carrying out a demodulation of the sub-carrier of the resulting signal so as to extract from it a second data sequence. A correlator is configured for performing a correlation between the two data sequences. Analysis circuitry is configured for carrying out the detection of the potential presence or of the absence of the object depending on the result of the correlation.

According to one embodiment, the modulator is configured for modulating the sub-carrier with a modulation non-detectable by the object.

According to one embodiment, the modulator is configured for modulating the sub-carrier with a modulation index lower than a threshold index compatible with a non-detectability of the modulation by the object.

The modulation index may for example be less than 1%.

However, more generally the modulator is advantageously configured for modulating the sub-carrier with a modulation index corresponding to the minimum modulation index able to be demodulated by the demodulator.

According to one embodiment, in which the result of a perfect correlation is equal to a reference correlation value, the analysis circuit is configured for detecting the absence of the object if the result of the correlation between the two data sequences is less than or equal to the reference correlation value and greater than or equal to a threshold correlation value, and for detecting a potential presence of the object if the result of the correlation between the two data sequences is lower than the threshold correlation value.

According to one embodiment, the reader furthermore comprises a calibration circuit configured for determining, in the absence of any object, the threshold correlation value.

According to one embodiment, the calibration circuit comprises the modulator configured for modulating the sub-carrier by a calibration data sequence, the receiver configured for receiving a signal on the antenna of the reader resulting from the transmission via the antenna of the modulated sub-carrier, the demodulator configured for demodulating the sub-carrier of the resulting signal so as to extract from it a third data sequence, and the correlator configured for performing a correlation between the calibration data sequence and the third data sequence, the result of this correlation supplying the threshold correlation value.

According to one embodiment, the reader furthermore comprises a verification circuit configured for, in the case of a detection of a potential presence of the object, verifying the effective presence of the object.

According to one embodiment, the reader comprises a receiver chain connected to the antenna, configured for allowing information to be received from the object according to the at least one contactless communications protocol and comprising a demodulator capable of demodulating, when the information is received, a sub-carrier modulated with a reference frequency chosen from within a group formed by one or more reference frequencies associated with one or more reference contactless communications protocols able to be used by the object for transmitting information to the reader. The processing circuit comprises the receiver chain, the frequency of the sub-carrier used by the processing circuit being chosen from within the group.

According to one embodiment, the verification circuit comprises a transmission chain and the receiver chain and is configured for, for at least one of the reference contactless communications protocols, transmitting specific identification request information conforming to this reference protocol and awaiting the reception of specific information in return transmitted by the object according to this reference protocol.

According to one embodiment, the calibration circuit is configured for, in the effective absence of an object, determining a new threshold correlation value.

BRIEF DESCRIPTION OF THE DRAWINGS

Other advantages and features of the invention will become apparent upon reading the detailed description of non-limiting embodiments of the invention and their implementation and from the appended drawings in which:

FIGS. 1 to 7 relate to embodiments of the invention and their implementation.

DETAILED DESCRIPTION OF ILLUSTRATIVE EMBODIMENTS

Figure 3:
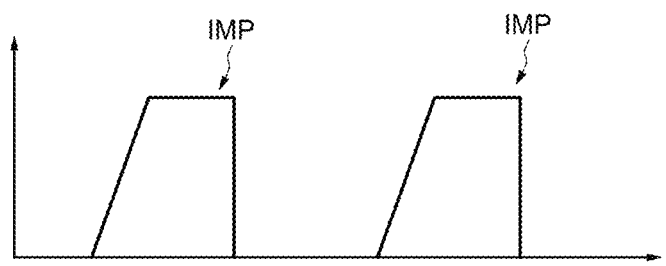

In FIG. 1, the reference 1 denotes a reader, for example but not limited to a cellular mobile telephone emulated in reader mode, or else a conventional reader of a contactless smartcard or of a tag such as a badge.

The reference 2 denotes a contactless object, for example a cellular mobile telephone emulated in card mode and, more generally, an electromagnetic transponder such as tag or a badge.

These two devices (the reader and the object), which are in this example NFC devices, form a contactless communications system allowing a near-field communication of the NFC type to be effected between the two devices.

For this purpose, the reader 1 possesses an antenna 5 and the tag 2 possesses an antenna 21, these two antennas being designed to be coupled via close magnetic fields generated by the reader.

The reader comprises a conventional transmission chain in connected between a digital processing module 3, for example a processor, and the antenna 5.

The transmission chain conventionally comprises circuitry 100 configured for generating a succession of pulses at a carrier frequency, for example 13.56 MHz. A modulator 101 allows the carrier signal to be modulated as a function of the information to be transmitted to the object. The transmission chain also comprises an amplifier 102 connected to the antenna 5.

Other conventional and known implementations of this transmission chain have not been shown for the sake of simplification.

The information transmitted from the reader to the object is demodulated by the receiver chain of the object 2.

In order to carry out the transmission of the information from the tag 2 to the reader 1, the reader generates, via its antenna 5, a magnetic field not modulated in amplitude, for example, in NFC communications, the sine wave at 13.56 MHz.

On the side of the tag, the antenna 21 modulates the field generated by the reader. This modulation is carried out by the object by modifying the load connected to the terminals of the antenna 21. This results in a change in the amplitudes of the voltages and currents present on the antennas 21 and 5.

This modulation is carried out at a sub-carrier frequency equal for example to 848 KHz in the case of the A and B protocols of the ISO 14443 standard.

A copy of the current flowing in the antenna 5 is generated in such a manner as to inject it into the receiver chain 20 of the reader where the resulting signal is demodulated in a demodulator 200 so as to extract the transmitted information.

The block 4 of the reader shows schematically the conventional circuits allowing the generation of the copy of the current flowing in the antenna 5.

FIG. 2 illustrates schematically processing circuitry MT configured for detecting a potential presence or absence of the object 2.

For this purpose, the processing circuitry uses a part of the transmission and receiver chains of the reader 1.

More precisely, a first data sequence SQ1, comprising logical "0"s and "1"s, is delivered to the modulator 101 of the transmission chain in such a manner as to modulate a sub-carrier of the carrier signal generated by the signal generator 100.

FIG. 3 illustrates the pulses IMP of the magnetic field generated at 13.56 MHz (the carrier signal).

Figure 4:
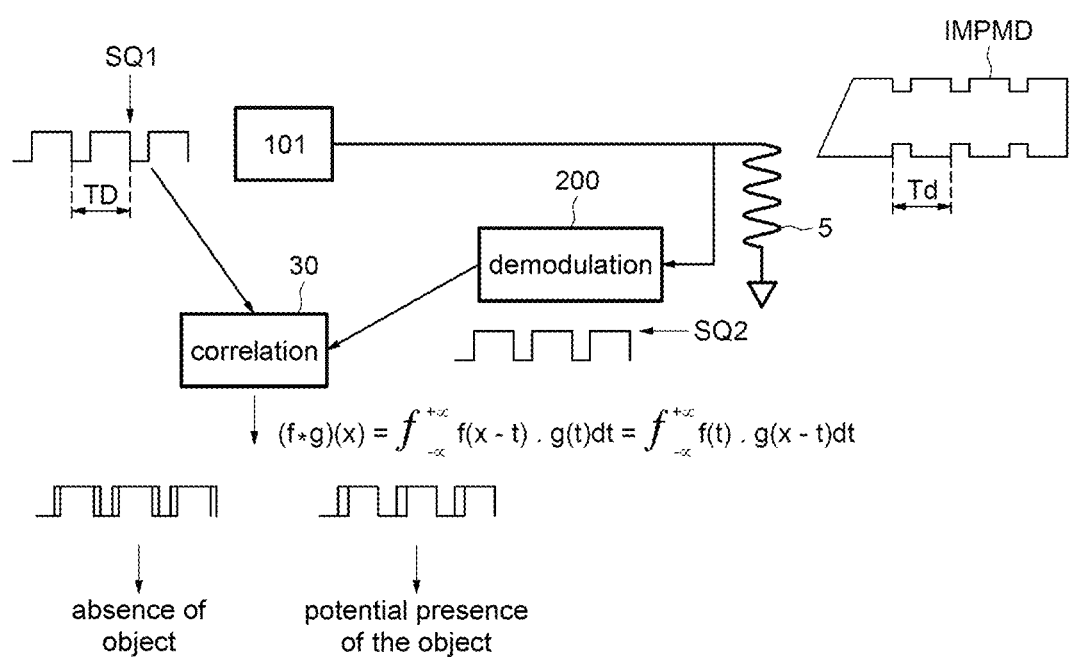

On the other hand, as illustrated in FIG. 4, the modulation of a sub-carrier, for example a sub-carrier at 848 KHz, of the carrier signal by the first data sequence SQ1 allows a carrier signal having a sub-carrier modulated by the first data sequence to be delivered to the antenna 5, this transmitted signal comprising the pulses IMPMD illustrated in FIG. 4.

The reader then receives the signal SR on the antenna resulting from this transmission, in other words resulting from its own sub-carrier modulation, and demodulates, in the demodulator adjusted to the frequency of the sub-carrier, here 848 KHz, this resulting signal so as to extract from it a second data sequence SQ2 (FIG. 2).

The processor 3 then comprises a correlator 30 capable of performing a correlation between the two data sequences SQ1 and SQ2 so as to deliver a correlation result.

This correlation result is subsequently analyzed in analysis circuit 31.

As illustrated schematically in FIG. 4, the correlation is carried out between the two data sequences SQ1 and SQ2 according to the formula illustrated in this FIG. 4.

If the two correlation sequences SQ1 and SQ2 more or less correspond, then it may be deduced from this that the object is absent.

On the other hand, if there is a more significant shift between the two data sequences, then a potential presence of the object may be deduced accordingly. This shift is due to a mismatch of the resonant circuits of the reader and of the object.

However, as will be seen in more detail hereinafter, this mismatch may also originate from the proximity of a metal mass, for example from the antenna 5 of the reader.

As illustrated in FIG. 4, the modulated pulses IMPMD correspond to a modulation of the sub-carrier here having a frequency of 848 KHz. As a consequence, this modulation frequency Fd (here equal to 848 KHz) corresponds to one period Td of the first data sequence SQ1 that can be found on the modulated pulses IMPMD.

Using, for the modulation of the sub-carrier, a frequency used by the object for the transmission of this information to the reader advantageously allows the receiver chain, and notably the demodulator of the reader, to be used, which allows a detection of the object to be obtained with a sensitivity at least as good as that obtained in the phase for communication between the reader and the object once the latter has been detected.

However, the modulation index is advantageously chosen in such a manner that this modulation of the sub-carrier is at least non-interpretable, and preferably non-detectable, by the object.

As is well known by those skilled in the art, the modulation index represents the depth of the amplitude trough and is obtained by the formula (Amax−Amin)/(Amax+Amin), Amax and Amin respectively denoting the maximum and minimum levels of the amplitude.

By way of example, if the amplitude of the unmodulated pulses is 10 volts, and if a modulation of 1 millivolt is chosen, a modulation index of the order of 0.01% will then be obtained, which makes this modulation non-detectable by the object.

However, a modulation index less than 1% is also satisfactory to render the modulation non-detectable by the object.

In practice, it is advantageous for the modulation index used by the modulator to be equal (to correspond) to the minimum modulation index that the demodulator is able to demodulate.

Figure 5:
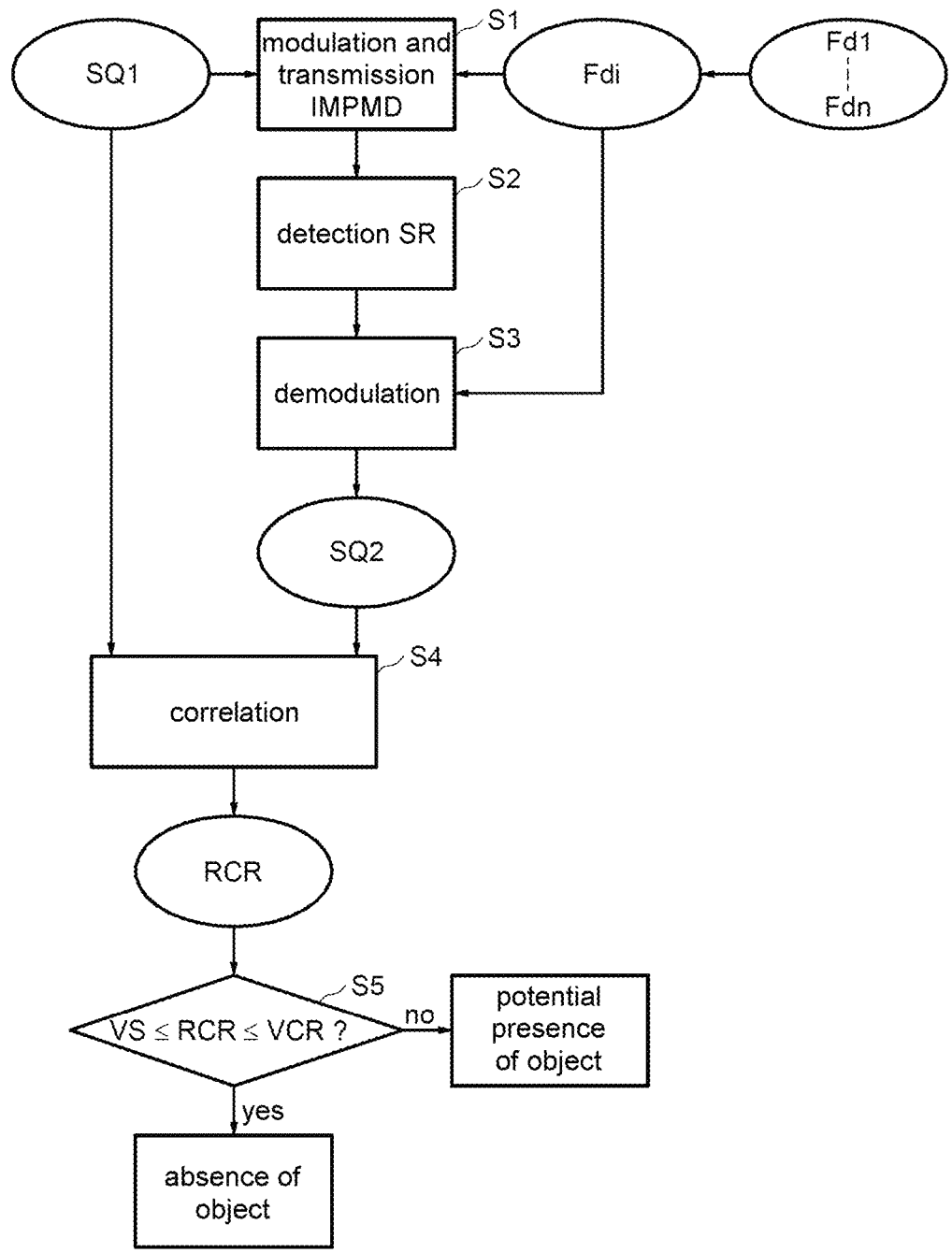

Reference is now more particularly made to FIG. 5 in order to describe one embodiment of a phase for detecting the potential presence or of the absence of the object 2.

In the step S1, as indicated hereinbefore, the modulation and the transmission of the modulated pulses IMPMD are carried out by using the first data sequence SQ1 and, for the modulation frequency, a reference frequency Fdi which may be chosen from amongst a group of reference frequencies Fd1-Fdn able to be used by the object according to the communications protocols usable by this object.

In the example, the frequency Fdi=848 KHz will be chosen.

In the step S2, the signal SR resulting from this transmission is detected on the antenna and a copy of the current flowing in the antenna 5 of the reader is injected into the receiver chain 20.

In the step S3, the demodulation of this resulting signal SR is carried out so as to obtain the second data sequence SQ2.

In the step S4, the correlation between the first data sequence SQ1 and the second data sequence SQ2 is performed so as to obtain a correlation result RCR.

Then, the analysis circuit 31 analyzes this correlation result.

For this purpose, a perfect correlation between the first data sequence SQ1 and the second data sequence SQ2 leads to a correlation result RCR equal to a reference correlation value, typically equal to 1.

However, depending on the environment of the reader and on the noise, a threshold correlation value VS is defined, by means, as will be seen in more detail hereinafter, of a calibration phase, and it is then considered that, if the correlation result RCR is less than or equal to the reference correlation value VCR and greater than or equal to the threshold correlation value VS, this corresponds to the absence of an object.

On the other hand, if the correlation result RCR is less than the threshold value VS, then it may be concluded from this that there is a potential presence of an object.

Figure 6:
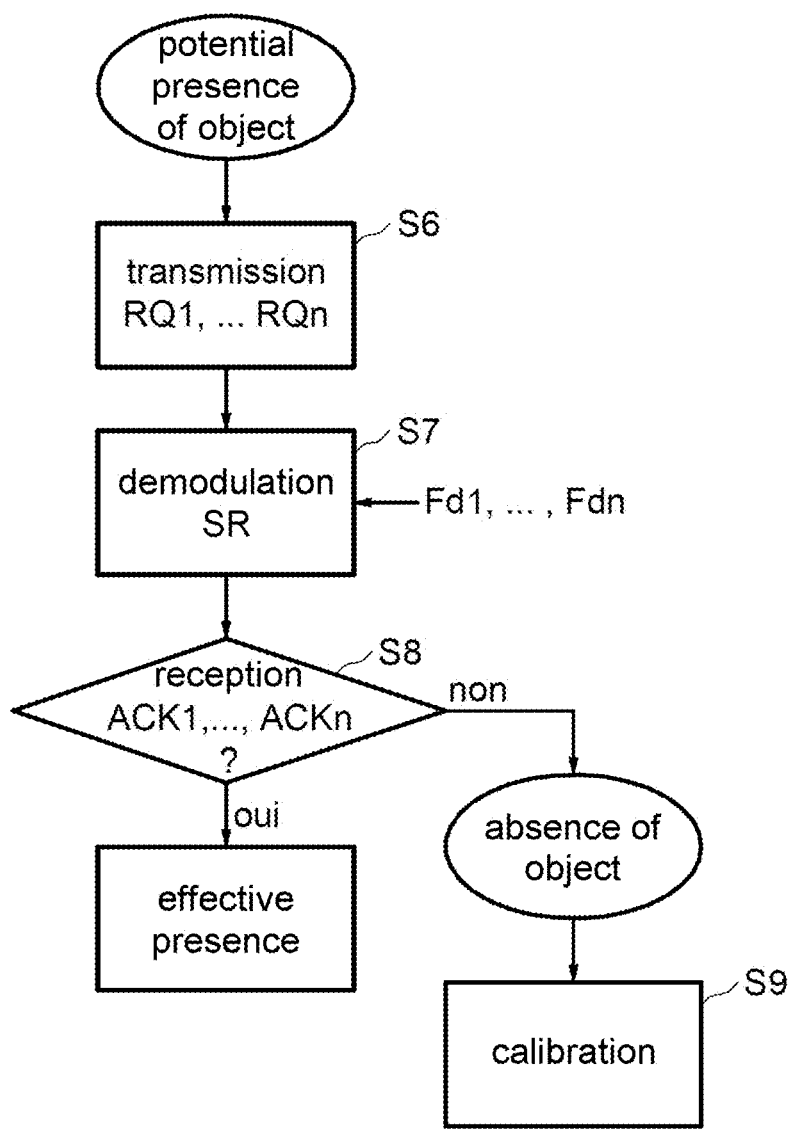

Then, a phase for verification of the effective presence of this object is carried out, one example of which is illustrated in FIG. 6.

This verification phase is carried out by a verification circuit which here comprises the transmission chain and the receiver chain.

In this verification phase, the reader transmits (step S6), for at least one of the contactless communications protocols able to be used by the object, and for example successively for all the contactless communications protocols able to be used by the object, specific identification request information, for example requests RQ1, . . . RQn conforming to this or these reference protocols.

The reader then demodulates, in the step S7, the resulting signal received on the antenna using the reference frequency modulating the sub-carrier used by the object to respond according to the protocol which is implemented within the object.

In the step S8, it is then verified that specific information is received in return, for example acknowledgements ACQ1, . . . ACQn respectively corresponding to the requests RQ1, . . . RQn.

If the corresponding standardized acknowledgement ACQi is received in response to a request RQi, then it may be concluded from this that there is an effective presence of the object and that this object communicates with a certain communications protocol.

If, on the other hand, no acknowledgement ACQi is received, then it may be concluded from this that there is no object in the neighborhood close to the reader and that this potential detection of an object which turned out to be positive is, in fact, a false detection due for example to the appearance of a metal mass in the neighborhood of the reader.

As illustrated in FIG. 6, a new calibration phase S9 is then advantageously carried out.

A calibration phase, whether it is carried out prior to any detection phase, or else in response to a potential detection of an object which actually proves to be a false detection, allows the threshold correlation value VS or else a new threshold correlation value VS to be determined.

This calibration phase is carried out by calibration circuitry, which comprises the modulator configured for modulating the sub-carrier by a calibration data sequence, the receiver configured for receiving, on the antenna of the reader, a signal resulting from the transmission via the antenna of the sub-carrier modulated, the demodulator configured for demodulating the sub-carrier of the resulting signal so as to extract from it a third data sequence, and the correlation circuit configured for performing a correlation between the calibration data sequence and the third data sequence.

Figure 7:
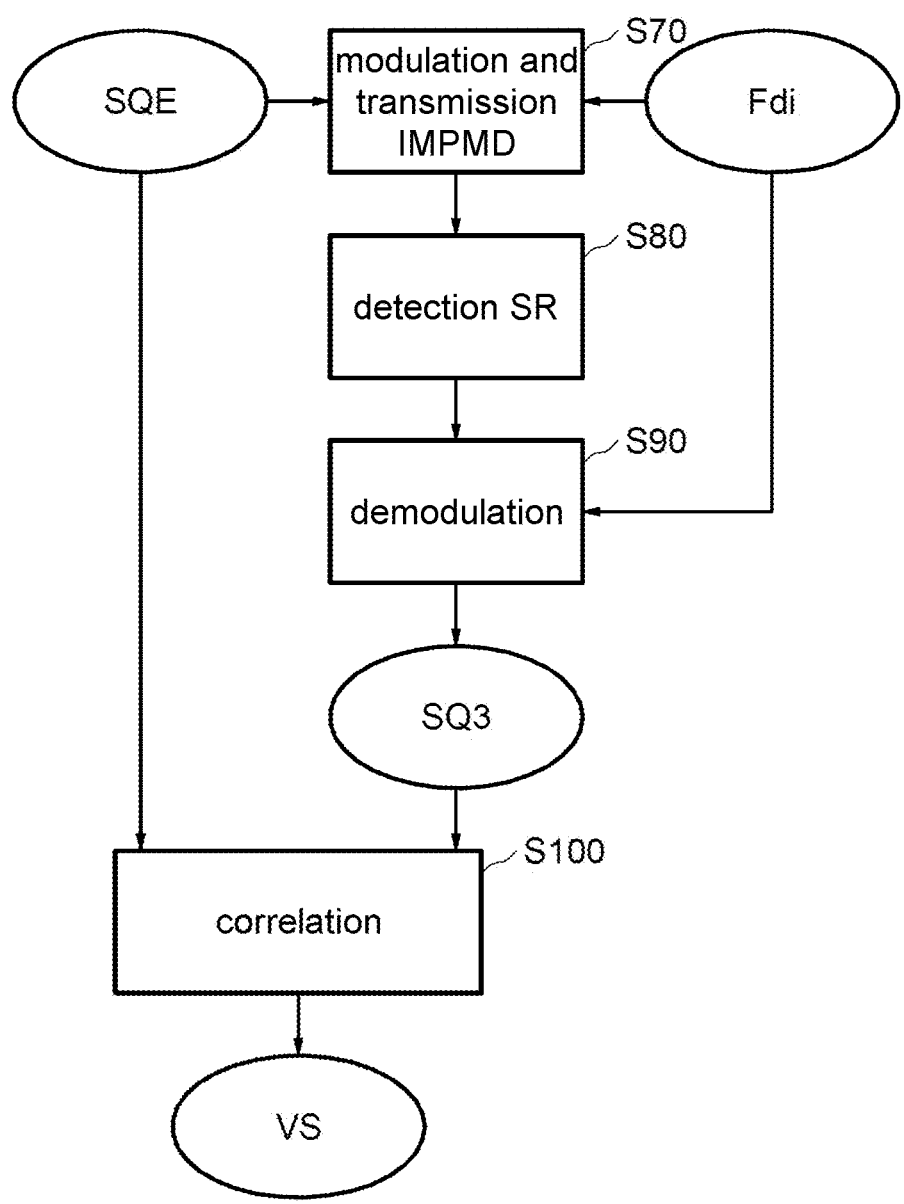

More precisely, as illustrated in FIG. 7, in the step S70, a modulation and a transmission of modulated pulses IMPMD are carried out in an analogous manner to what has been described hereinbefore, by using a or one of the reference sub-carriers frequencies Fdi, together with a calibration data sequence SQE which may be identical to or different from the first data sequence SQ1.

In the step S80, the signal resulting from this transmission (signal SR) is detected and is demodulated in the step S90 within the demodulator of the receiver chain so as to obtain a third data sequence SQ3.

Then, the correlation between the calibration data sequence SQE and the third data sequence SQ3 is carried out (step S100), the result of this correlation supplying the initial threshold correlation value VS or a new threshold correlation value VS.

What is claimed is:

1. A method, comprising:
   transmitting, by an antenna of a first communication device, a magnetic field on a carrier signal comprising a modulated sub-carrier, the modulated sub-carrier being a sub-carrier of the carrier signal modulated by a first data sequence, the modulated sub-carrier being non-detectable by a second communication device;
   receiving, on the antenna of the first communication device and in response to the transmitting, a resultant signal;
   demodulating, in the first communication device and using a demodulation signal having a frequency of the sub-carrier, the resultant signal, the demodulating generating a second data sequence from the resultant signal;
   correlating the first data sequence and the second data sequence; and
   detecting a potential presence of the second communication device or an absence of the second communication device based upon a result of the correlating.

2. The method according to claim 1, wherein the modulated sub-carrier is non-interpretable by the second communication device as being a transmission of information from the first communication device.

3. The method according to claim 1, wherein a modulation of the sub-carrier by the first data sequence has a modulation index lower than a threshold index compatible with a non-detectability of the modulation by the second communication device.

4. The method according to claim 3, wherein the modulation index is less than 1%.

5. The method according to claim 3, wherein the modulation index corresponds to a minimum index capable of being demodulated.

6. The method according to claim 1, further comprising detecting the absence of the second communication device when the result of the correlating is greater than or equal to a threshold correlation value, and detecting the potential presence of the second communication device when the result of the correlating is lower than the threshold correlation value.

7. The method according to claim 6, further comprising, prior to transmitting the magnetic field, determining the threshold correlation value in the absence of any second communication device.

8. The method according to claim 7, wherein determining the threshold correlation value comprises:
   transmitting, by the antenna of the first communication device, the magnetic field on the carrier signal having the sub-carrier modulated by a calibration data sequence;
   receiving, on the antenna of the first communication device, a resultant calibration signal resulting from the transmitting;
   demodulating, in the first communication device and using a demodulation signal having the frequency of the sub-carrier, the resultant calibration signal, the demodulating generating a third data sequence from the resultant calibration signal; and
   correlating the calibration data sequence and the third data sequence to generate a correlation value that is selected as the threshold correlation value.

9. The method according to claim 1, wherein the first communication device and the second communication device respectively comprise a reader and an object capable of mutually communicating via a near-field communications (NFC) protocol.

10. A method for detecting a potential presence or an absence of an object by a reader, the method comprising:
    modulating, by the reader, a sub-carrier by a first data sequence to generate a modulated sub-carrier;
    transmitting, by an antenna of the reader, a magnetic field on a carrier signal having the modulated sub-carrier, the modulated sub-carrier being non-detectable by the object and non-interpretable by the object as being a transmission of information from the reader, wherein the modulated sub-carrier has a frequency corresponding to a reference frequency associated with a contactless communications protocol;
    receiving, on the antenna of the reader and in response to the transmitting, a resultant signal;
    demodulating, in the reader, the resultant signal using a demodulation signal having the reference frequency to generate a second data sequence from the resulting signal;
    correlating the first data sequence with the second data sequence; and
    detecting the potential presence or the absence of the object based upon a result of the correlating.

11. The method according to claim 10, wherein a perfect correlation between the first data sequence and the second data sequence is equal to a reference correlation value, the absence of the object being detected when a result of the correlating is less than or equal to the reference correlation value and greater than or equal to a threshold correlation value, and the potential presence of the object is detected when the result of the correlating is lower than the threshold correlation value.

12. The method according to claim 10, further comprising verifying an effective presence of the object in response to detecting the potential presence of the object, wherein the verifying comprises:
    transmitting, by the reader, specific identification request information conforming to the contactless communications protocol; and
    waiting to receive, from the object, specific acknowledgment information in response to transmission of the specific identification request information.

13. The method according to claim 12, further comprising verifying the effective presence of the object in response to receiving the specific acknowledgment information from the object.

14. A reader, capable of communicating with an object by a contactless communications protocol via an antenna, the reader comprising:
    a modulator configured to modulate a sub-carrier by a first data sequence to generate a modulated sub-carrier, the modulated sub-carrier being non-detectable by the object;
    a transmitter configured to transmit, via the antenna, a magnetic field on a carrier signal comprising the modulated sub-carrier;
    a receiver configured to receive a resultant signal on the antenna in response to transmission of the magnetic field;
    a demodulator configured to demodulate the resultant signal using a demodulation signal having a frequency of the sub-carrier to generate a second data sequence;
    a correlator configured to perform a correlation between the first data sequence and the second data sequence; and
    an analysis circuit configured to detect a potential presence of the object or an absence of the object based upon on a result of the correlation.

15. The reader according to claim 14, wherein the modulated sub-carrier is non-interpretable by the object as being a transmission of information from the reader.

16. The reader according to claim 15, wherein the modulator is configured to modulate the sub-carrier with a modulation index lower than a threshold index compatible with a non-detectability of the modulation by the object.

17. The reader according to claim 16, wherein the modulator is configured to modulate the sub-carrier with a modulation index less than 1%.

18. The reader according to claim 16, wherein the modulator is configured to modulate the sub-carrier with a modulation index corresponding to a minimum modulation index able to be demodulated by the demodulator.

19. The reader according to claim 14, wherein the analysis circuit is configured to detect the absence of the object when the result of the correlation is greater than or equal to a threshold correlation value, and to detect the potential presence of the object when the result of the correlation is lower than the threshold correlation value.

20. The reader according to claim 14, further comprising a verification circuit configured to verify an effective presence of the object upon detection of the potential presence of the object.

\* \* \* \* \*